Sept. 12, 1939.　　　　G. T. RANDOL　　　　2,173,080

CONTROL MECHANISM FOR CHANGE SPEED TRANSMISSIONS

Filed March 17, 1937　　　　4 Sheets-Sheet 1

INVENTOR
GLENN T. RANDOL,
ATTORNEY.

Sept. 12, 1939.                G. T. RANDOL                2,173,080
         CONTROL MECHANISM FOR CHANGE SPEED TRANSMISSIONS
               Filed March 17, 1937          4 Sheets-Sheet 2

INVENTOR:
GLENN T. RANDOL,
By P. H. Lamphere
ATTORNEY.

Sept. 12, 1939.  G. T. RANDOL  2,173,080

CONTROL MECHANISM FOR CHANGE SPEED TRANSMISSIONS

Filed March 17, 1937  4 Sheets-Sheet 3

INVENTOR:
GLENN T. RANDOL,
By P. H. Lamphere
ATTORNEY.

Sept. 12, 1939.　　　　G. T. RANDOL　　　　2,173,080
CONTROL MECHANISM FOR CHANGE SPEED TRANSMISSIONS
Filed March 17, 1937　　　4 Sheets-Sheet 4

INVENTOR.
GLENN T. RANDOL.
BY P. H. Lamphere
ATTORNEY.

Patented Sept. 12, 1939

2,173,080

UNITED STATES PATENT OFFICE 2,173,080

CONTROL MECHANISM FOR CHANGE SPEED TRANSMISSIONS

Glenn T. Randol, Miami, Fla., assignor to The Randol Corporation, St. Louis, Mo., a corporation of Missouri Application March 17, 1937, Serial No. 131,393

19 Claims. (Cl. 74—334)

This invention relates to an improved control mechanism for automobile change speed transmissions of the general character disclosed in my Patent No. 1,577,361, issued March 16, 1926, and has as one of its objects to provide a mechanism wherein the forward movement of the clutch pedal will be utilized not only for neutralizing the gearing but also for positively shifting any selected gear or clutch into mesh, thereby eliminating any uncertainty in shifting the gearing under all operating conditions of the vehicle.

A further object is to provide a mechanism embodying either a slidable or rotatable member for converting the continuous forward movement of the clutch pedal into the two-way motion necessary for shifting the selectors of the control mechanism toward each other to neutralize an active gear ratio and for shifting the selectors apart to render a selected gear ratio active.

Another object is to provide a clutch pedal operated control mechanism for shifting a change speed gearing employing synchronizing units, which is so constructed that there will be no unnecessary additional resistance imparted through the clutch pedal to the foot of the operator by the functioning of the synchronizing units during gear ratio changing. I attain this object by the employment of spring means in the mechanism which will permit the clutch pedal to be moved relatively to the rest of the shifting mechanism in the event the synchronizing unit offers resistance and by this relative movement causes energy to be stored up in the spring means and subsequently dissipated after the synchronizing units have functioned, thus either assisting or wholly performing the actual shifting of the gears or positive clutches of the gearing.

Another object is to provide an improved hand selecting mechanism to be positioned adjacent the steering wheel of the motor vehicle which will employ the H slot control now standardized in the manual shifting mechanism of a conventional change speed gearing. In my mechanism, however, means is provided whereby the operating lever is slidable parallel to the plane of the steering wheel to select the reverse and low slot or the second and high gear slot and is rotatable in the same plane of the steering wheel to definite stop positions to perform the actual selection of the gear ratio desired. Such control permits the use of one finger to select and move the hand indicator to the desired position without the necessity of taking the hand from the rim of the steering wheel and losing its effectiveness in steering the car.

Still a further object is to provide in a preselecting control mechanism for a change speed gearing an improved interlock for preventing one gear ratio from being rendered active while another gear ratio is active and to also lock all the gearing in neutral position when the selecting means is positioned in the indicated neutral position.

Another object of my invention is to provide in a change speed gearing control mechanism of the kind referred to, stop means which will function to limit the axial travel of the selectors when they are moved to cause certain sets of gears of the gearing to be operative.

Other objects of my invention will become apparent from the following description taken in connection with the accompanying drawings in which.

Figure 3:
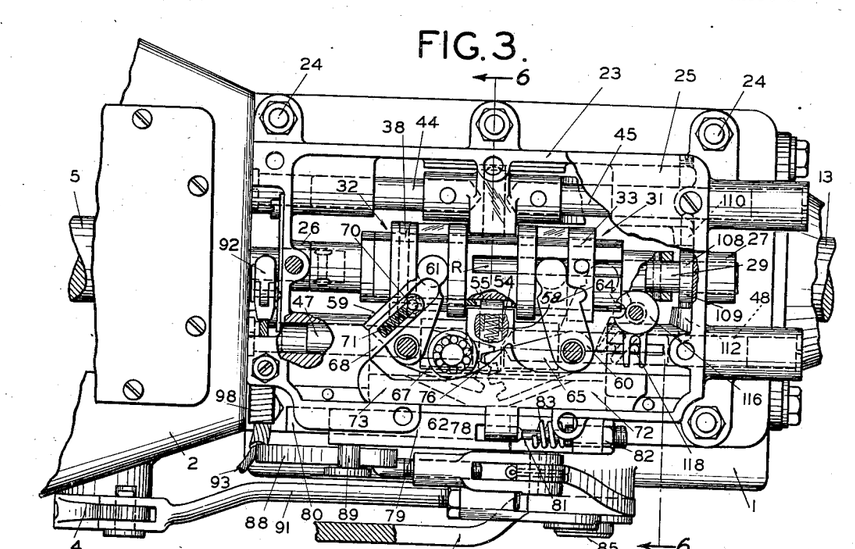
Figures 3 and 4 are views similar to Figures 1 and 2 showing the control mechanism in a position wherein the synchronizing unit of the high speed gear ratio is functioning and the ratio is about to be rendered active.

Referring to the drawings in detail, 1 indicates the change speed gearing housing attached to the clutch housing 2 containing the main friction clutch (not shown) controlled by the shaft 3 and the lever 4 secured to its exterior end. The change speed gearing with which I have associated my invention is of the conventional type having a driving shaft 5 and a driving gear 6 connected through the main clutch to the engine. This driving gear is in mesh with the gear 7 on a counter shaft 8 for driving the cluster gears 9, 10, and 11 (Figure 3). The gear 9 is in constant mesh with the intermediate or second speed gear 12 rotatably mounted upon the driven shaft 13 of the gearing which is connected to the wheels of the vehicle. This driven shaft also has slidably splined thereon a gear 14 for selectively meshing with gear 10 on the counter shaft for low speed and with the idler gear 15 driven by gear 11 for the reverse speed ratio. The main driving gear 6 has integral therewith a clutch element 16 and a similar clutch element 17 is integral with the second speed gear 12. These clutch elements are adapted to selectively cooperate with a sliding clutch element 18 for controlling the high and second speed ratios, the element 18 being splined upon a synchronizing member 19 which in turn is splined upon the driven shaft 13. The synchronizing member and clutch elements 16 and 17 are provided with cooperative friction surfaces 20 and 21 whereby it is possible to frictionally connect clutch elements 16 and 18 or 17 and 18 prior to positive engagement of these elements by a sliding movement of element 18. The synchronizing member is actuated by clutch element 18 through a ball detent 22 and this ball detent is so arranged that clutch element 18 is disconnected to slide relative to the synchronizing member 19 after the friction surfaces 20 and 21 have become engaged. The action of the synchronizing means is well known in the art and it is believed unnecessary to describe it further in detail.

Figures 5, 6, 13, 16:
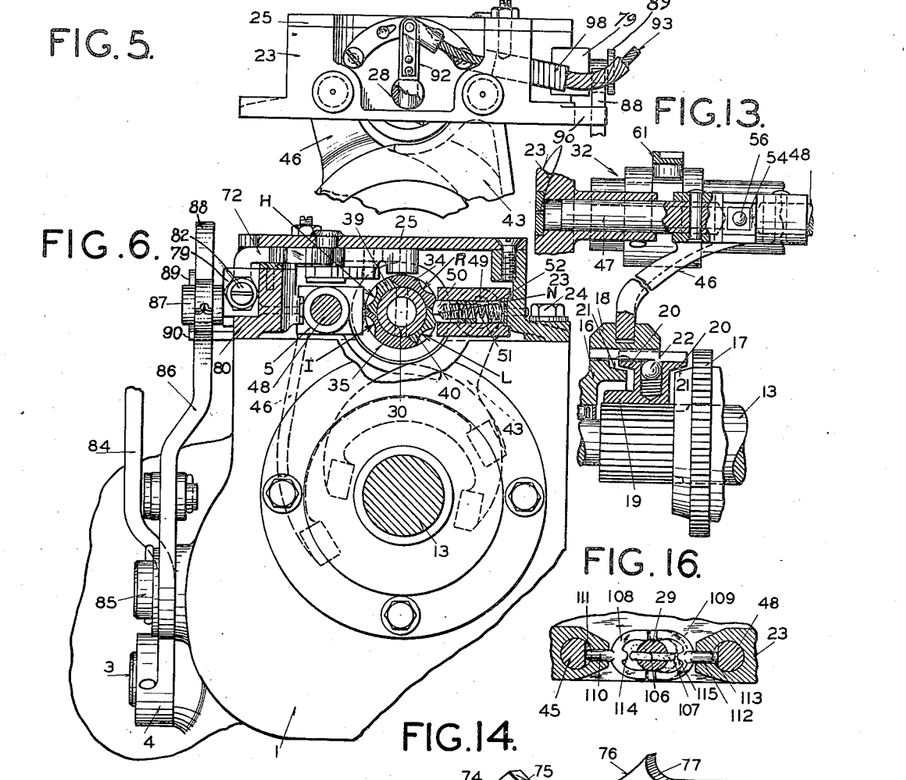
Figure 5 is an end view of the control mechanism showing a portion of the structure for rotating the selectors.
Figure 6 is a cross-sectional view taken on the line 6—6 of Figure 3, the selectors being in neutral position.
Figure 13 is a view showing a portion of the control mechanism and the high speed positive clutch of the gearing in active position.
Figure 16 is a cross-sectional view taken on the line 16—16 of Figure 1 showing the interlocking mechanism.

My novel control mechanism for shifting the clutch element 18 and gear 14 of the change speed gearing just described is mounted directly on top of the gear housing 1 and is enclosed within a casing 23 bolted to the top of the housing by means of bolts 24, the casing being covered by the cover 25. The front and rear end walls of casing 23 are provided with aligned bearings 26 and 27 in which are mounted short shafts 28 and 29 pinned in the ends of sleeve 30. Slidably and rotatably mounted upon this sleeve are companion selectors generally indicated by numerals 31 and 32. These selectors are of similar construction, selector 31 (Figure 7) comprising a collar 33 from which extends a pair of fingers 34 and 35 pinned to the collar by pin 36 extending through both the fingers and lying in a pair of opposed slots 37 in sleeve 30, thus producing a construction wherein the collar and fingers are rotatable with sleeve 30 but are permitted to slide longitudinally with respect to the sleeve. The selector 32 comprises a collar 38 carrying fingers 39 and 40 pinned thereto by a pin 41 (Figure 1) extending through the collar and fingers and also lying in the opposed slots 42 in sleeve 30. The fingers 34 and 35 of selector 31 and fingers 39 and 40 of selector 32 are positioned in interengaging relation as best shown in Figure 6. As shown in this figure, finger 34 is provided with a longitudinal groove R; finger 40 with a longitudinal groove L; finger 35 with a longitudinal groove I; and finger 39 with a longitudinal groove H, these being the reverse, low, intermediate and high grooves for selecting and rendering active the speed ratios of the gearing. The grooves extend over only a portion of the length of the surface of each finger, their length being such that when the selectors are moved to their innermost position on sleeve 30, the ends of the grooves will be in overlapping relation for a purpose which will become apparent later. The adjacent fingers 34 and 40 are each provided with cooperating grooved portions which together form a groove marked N, this being the groove corresponding to neutral condition of the gearing.

The shifting fork 43 for the slidable gear 14 has its hub portion secured to oppositely extending rods 44 and 45, rod 44 being journaled for sliding movement in the forward wall of casing 23 and rod 45 being journaled for sliding movement in the rear wall of casing 23. The shifting fork 46 for clutch element 18 has its hub portion secured to oppositely extending rods 47 and 48 (Figure 13), rod 47 being journaled for sliding movement in the forward wall of casing 23 and rod 48 being journaled for sliding movement in the rear wall of casing 23. The hub portion of shifting fork 43 has formed thereon a cross passage 49 (Figure 6) in which is slidably mounted the detent 50 biased toward the companion selectors by a spring 51 which also acts upon a detent 52 in the same passage 49, this latter detent cooperating with three recesses 53 in the side of casing 23 whereby the shifting fork may be yieldably held in its three different positions. The hub of shifting fork 46 is provided with the same type of detent structure as the hub of shifting fork 43 and comprises a passage 54 in which is a plunger 55 for cooperation with the grooves in the selectors and a detent 56 for cooperation with recesses 57 (Figure 1) in the wall of the casing for yieldably holding the shifting fork in its three different positions. These detents are biased in opposite directions by a spring 58 (Figure 3) positioned between the two detents.

With the selectors 31 and 32 in their innermost position as shown in Figure 3, they may be freely rotated to place the detent 50 in the R or L grooves and the detent 55 in the I or H grooves selectively. If the detent 50 is in the L groove, for example, then when the selectors are moved apart the end of the groove will engage the detent and move the shifting fork with the selector 32 and thus engage low gear. The other gears or tooth clutches are engaged in like manner when the proper detent is in the proper groove. None of the gears are moved when the detent 50 is in groove N as this groove is not provided with a shoulder for engaging and moving the detent and consequently the shifting fork. In the event the selectors are in their outermost position a detent may be placed in alignment with a cooperating groove by rotating the selectors but it will not engage the groove until the selectors are moved to their innermost position. The shifting forks are carried to their central neutral position from an operative position by means of the collars 33 and 38 engaging the portions of the hubs of the shifting forks that carry the detents 50 and 55. Thus it is seen that whenever the selectors are moved to their innermost position the gearing will always be placed in neutral regardless of the rotative positions of the selectors.

In order to shift selectors 31 and 32 in opposite directions and thus move a shifting fork which may be selectively connected therewith as a result of a proper rotation of the selectors, I provide simultaneously movable bell crank levers 59 and 60, both of which are pivotally mounted on the under side of the cover plate 25. The arm 61 of lever 59 is adapted to engage in a groove in collar 38 formed by cutting away a portion of the collar, and the other arm 62 has formed upon its end, gear teeth 63. The arm 64 of lever 60 engages in a groove in collar 33 also formed by cutting away a portion of the collar (see Figure 9), and the other arm 65 has formed upon its end, gear teeth 66 meshing with gear teeth 63. The arm 62 of lever 59 has rotatably mounted thereon a roller 67 and the other arm 61 of said lever has slidably mounted thereon in a suitable groove a dog 68. This dog is formed with a slot 69 receiving a pin 70 and the dog is normally biased by a spring 71 to a position wherein the pin engages one end of the slot to prevent displacement of the dog. A slidable cam 72 is mounted in the side of casing 23 for actuating levers 59 and 60 by proper cooperation with the dog and roller mounted on lever 59. The cam (Figure 14) is formed with a head 73 having a forward surface 74 adapted to engage dog 68 when the cam is moved forwardly and a rear inclined surface 75 for pushing the dog aside and permitting rearward movement of the cam after the head has passed the dog. The central portion of the cam is also formed with an inclined portion 76 for cooperation with roller 67. The back side 77 of this inclined portion forms an abutment for engagement with lever 60 to limit the rearward movement of the cam.

Figures 10, 11, 12, 15, 18, 19:
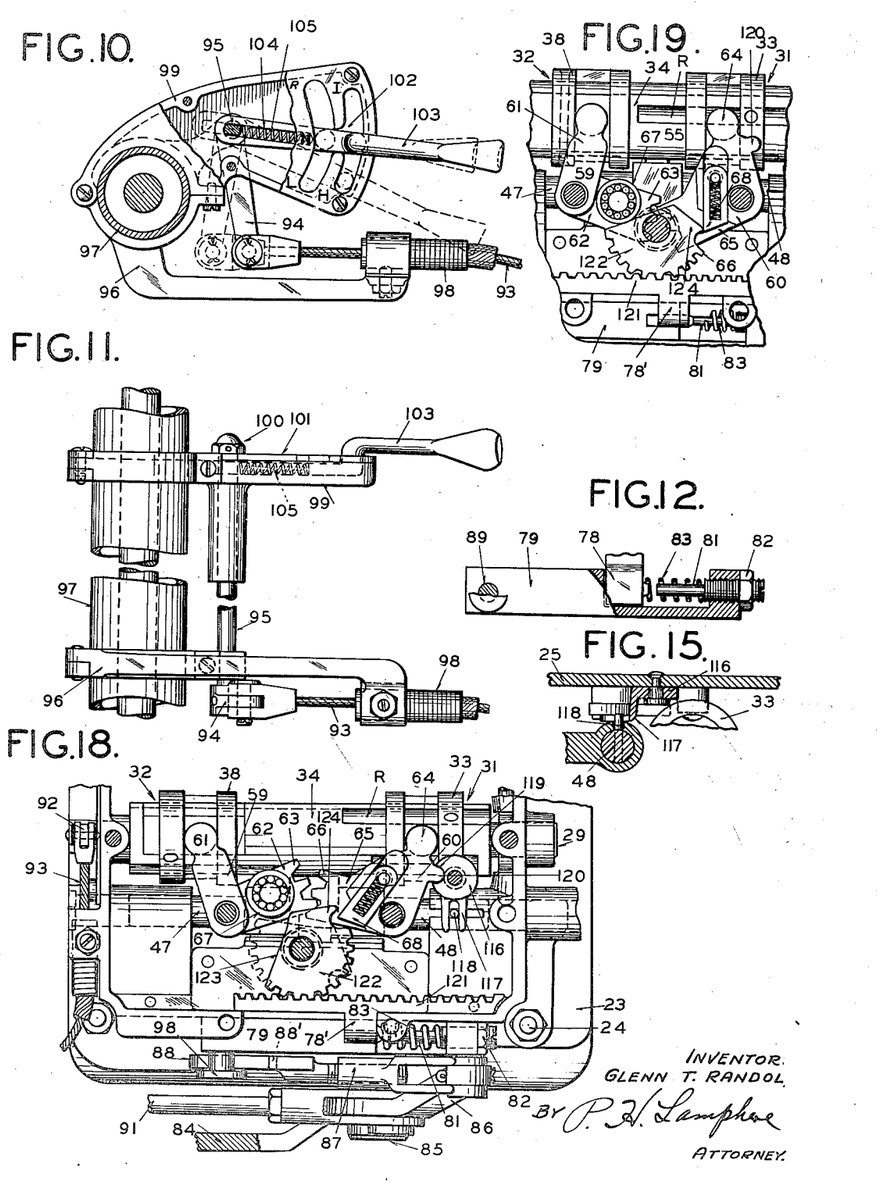
Figure 10 is a top view of the hand control mechanism for selecting the gear ratios.
Figure 11 is a side view showing how the hand control is mounted on the steering column.
Figure 12 is a view, partly in section, of the spring means between the pedal and the selectors for eliminating the resistance set up by the synchronizing units of the gearing.
Figure 15 is a cross-sectional view of the adjustable stop for limiting the travel of the selectors under certain conditions.
Figures 18 and 19 are views of a modified control mechanism showing the use of a rack and pinion in place of the sliding cam.

The cam also has formed thereon an L-shaped portion 78 which extends through a slot in the exterior of casing 23 and projects downwardly into a cut away portion in a bar 79 mounted for sliding movement on a shelf 80 on the exterior portion of casing 23. The actuating connection between the bar and portion 78 of the cam comprises an adjustable pin 81 threaded in the end of the bar and adapted to engage portion 78. The adjustment of the pin is maintained by a nut 82 and this pin, as shown in Figure 12, is normally adjusted so as to be spaced from portion 78 when this portion is in engagement with the end of the cut away portion of the bar wherein it is biased by a fairly strong spring 83 surrounding the pin. This connection is a very important one as it permits the bar to move the cam through the medium of the spring until a predetermined resistance is encountered whereupon there will be relative movement between the bar and cam causing the spring to be compressed and the pin to directly engage portion 78 and move the cam. The importance of this connection and its relation to the proper functioning of the mechanism as a whole will be more thoroughly discussed later along with the operation of the mechanism.

The forward end of bar 79 is adapted to be actuated by clutch pedal 84 which is pivotally mounted on the side of gearing housing 1 by a pin 85. The pedal has an integral arm 86 extending upwardly along the side of the housing and pivotally mounted at its end is a forwardly extending push rod 87. The end of the push rod carries a hooklike member 88, the inner or curved end 88' of which is adapted to engage a pin 89 on the forward end of bar 79 whereby the bar can be moved forwardly. The outer end of member 88 normally rests upon the end of a ledge 90 positioned slightly below shelf 80 upon which bar 79 slides. The arm 86 on the clutch pedal is connected to clutch arm 4 by an adjustable rod 91. The construction is such that when the clutch pedal is initially moved to disengage the clutch, bar 79 will not be moved as the hooklike member 88 will only slide on the end of ledge 90 to a point where curved end 88' will engage pin 89. Additional movement of the clutch pedal will cause the bar and push rod 87 to move in unison, the hooklike member, under these conditions, sliding on the top of ledge 90.

Referring particularly to Figures 10 and 11 wherein the means for rotating the companion selectors 31 and 32 for selectively connecting the shifting forks is shown, the short shaft 28 has secured thereto an upstanding arm 92 to which is connected a flexible cable 93 extending to a point adjacent the base of the steering column where it is connected to an arm 94 on the end of a rotatable shaft 95. This shaft is journaled in a suitable supporting bracket 96 carried by the steering column 97, and the bracket also serves as the means for rigidly supporting one end of the sheath 98 surrounding the cable, the other end of the sheath being rigidly supported by the forward end of cover 25.

The shaft 95 extends upwardly along side of the steering column and projects through a horizontally disposed casing 99 secured to the column just below the steering wheel (not shown), the shaft being held in the casing by a nut 100 in abutting relation with cover 101 of the casing. This cover is provided with an H slot 102, the ends of the slots being marked with the letters L, I, H, and R as indicated in order to designate low, second, high, and reverse of the gearing. A lever 103 cooperates with the H slot, this lever having a horizontal portion exterior of casing 99 for cooperation with the operator's fingers and a parallel portion lying in the casing, the two portions being connected together by a central vertical portion which cooperates with the slot. The end of the lever in the casing is formed with a slot 104 which receives a square portion of shaft 95 in order to permit the lever to be moved in a horizontal plane relative to the shaft while at the same time permitting the lever to rotate the shaft. A spring 105 in slot 104 biases the lever to a position wherein the shaft is against the end of the slot and the vertical part of the lever is in alignment with the slots marked 2 and 3 of the H slot.

Figure 1:
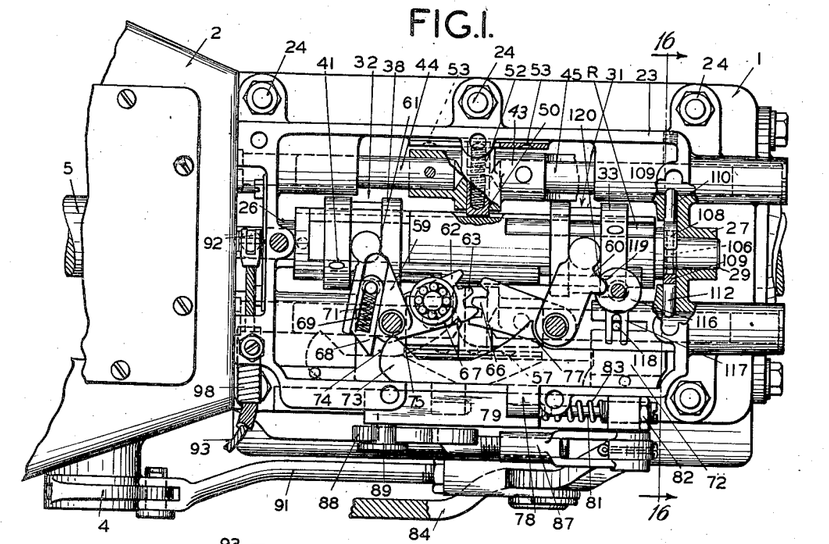
Figure 1 is a top view of a change speed gearing having associated therewith my novel control mechanism, the parts being shown in neutral position.

In order to prevent the set of gears of one speed ratio from being rendered active while the set of gears of another speed ratio is active and to also lock the gearing in neutral position when the hand lever is in the indicated neutral position, I associate with the mechanism just described an improved interlock which is best shown in Figures 1 and 16. The short shaft 29 at the point where it extends through journal 27 in the rear of casing 23 is provided with a cross passage 106 in which is slidably positioned a pin 107. On opposite sides of the shaft are mounted U-shaped members 108 and 109 which are so positioned as to surround the shaft, member 108 having a projection 110 extending through the casing for cooperation with a recess 111 in rod 45 when the fork 43 connected thereto is in its neutral position and member 109 having a projecting portion 112 extending through the casing for cooperation with a recess 113 in rod 48 when fork 46 connected thereto is in its neutral position. The inner surface of member 108 has a projection 114 and the inner surface of member 109 has a projection 115. These projections are of such length that when the U-shaped members 108 and 109 are spaced apart and their projections 110 and 112 are in their respective recesses of the rods, pin 106 will just fit between projections 114 and 115 and prevent the U-shaped members from moving inwardly. Thus both rods 45 and 48 will be held in their neutral positions. The position of pin 106 in rod 29 is such that it will assume its locking position (full lines Figure 16) when the selectors are in neutral position as set by control lever 103.

The U members 108 and 109 and projections 110 and 112 thereon are of an over-all length equal to the distance between rods 45 and 48 plus the depth of one of the recesses 111 or 113. Because of this relation it is apparent that when one of the rods is moved from its neutral position, the U members will be engaged and the other rod held from movement due to its recess receiving the adjacent projection. Thus if one rod is in a position corresponding to an active gear ratio position, the other rod will be held in its neutral position and it is possible to only move one rod and, therefore, one shifting fork at a time.

The relationship between pin 107 and the short projections 114 and 115 is also such that when the selector is set in a speed ratio position and the shifting fork corresponding to this speed ratio is in a position causing said speed ratio to be active, the selectors cannot be rotated by hand lever 103 to select another speed ratio because the projections will act as stops for pin 107 and prevent any rotation of the selectors. This condition is illustrated in Figure 16 wherein the pin, as shown in dashed lines, is in the position corresponding to the high speed selective position of the selectors as shown in Figure 3. When the gearing forming the high speed ratio is operative, rod 48 will be moved forwardly and this will cause the U-shaped member 109 to move to the dashed line position wherein projection 115 will be in the path of rotation of pin 107, thus preventing rotation of the selectors by hand lever 103 until rod 48 is again moved to its neutral position wherein projection 112 can move into recess 113.

Figure 2:
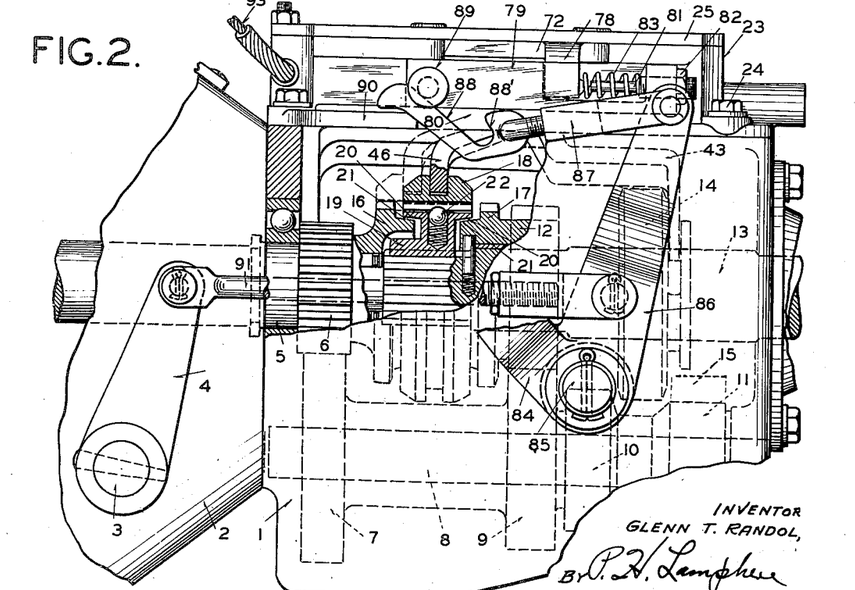
Figure 2 is a side elevation of the control mechanism, the second and high speed positive clutch and synchronizing units of the gearing being shown in section.

Referring to the operation of the above described mechanism, when the clutch pedal is in clutch-engaged position, selectors 31 and 32 will be in their outermost position, as shown in Figure 1, and push rod 87 for actuating bar 79 will be in the position shown in Figure 2. When control lever 103 is in its neutral position, as shown in full lines in Figure 10, the rotative position of the selectors will be as indicated in Figures 1 and 6 and detent 50 will be in the neutral groove marked N. If it is now desired to place the change speed gearing in low gear, control lever 103 is pushed inwardly by the end of the operator's finger to a point where the vertical portion is aligned with the slot marked L and then rotated to the end of this slot. This rotation of the lever will cause the selectors to be rotated by means of cable connection 93 and thus place detent 50 in alignment with the groove marked L in finger 40 of selector 32. The detent will not engage this groove as yet since the selectors are in their outermost position. If the clutch pedal is now depressed to its fullest extent, the clutch will first be disengaged and then bar 79 operated by means of the hook-shaped member 88. When the bar is moved, cam 72 will be carried therewith and head 74 of this cam will engage dog 68, thereby causing levers 59 and 60 to be rotated in unison and because of their connection with selectors 31 and 32, the selectors will be moved to their innermost position as indicated in Figure 3. When the selectors reach this innermost position, groove L will be in a position to receive detent 50 adjacent its end. Continued movement of the clutch pedal downwardly will result in continued forward movement of cam 72 with the head 74 passing the dog 68 due to the position of lever 59 and thus causing the inclined surface 76 to engage roller 67 on arm 62 of lever 59 and rotate lever 59 in a counter-clockwise direction. Due to the geared connection between levers 59 and 60, lever 60 will be simultaneously moved in a clockwise direction and thus selectors 31 and 32 will be moved outwardly to the same position that they were in prior to the depressing of the clutch pedal. Movement of selector 32 outwardly carries with it shifting fork 43 due to the engagement of the detent with the end of slot L. The movement of the shifting fork results in the engagement of gear 14 with gear 10, thereby placing the change speed gearing in low gear. The levers are now in the position shown in Figure 1 and the cam 72 is as shown in dashed lines in the same figure.

Figure 4:
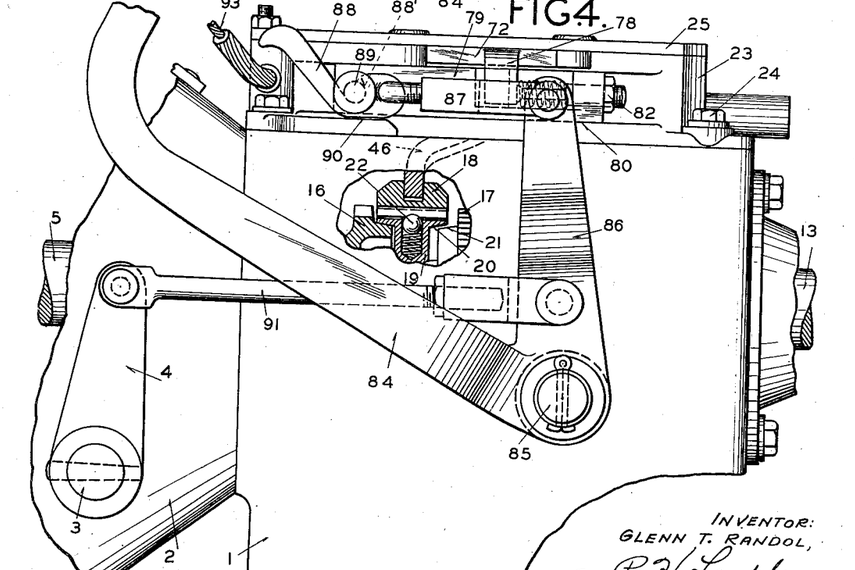

When the clutch pedal is released to engage the clutch to connect the engine to the road wheels, the bar 79 will be carried rearwardly by the hook-like member 88 since the ledge 90 holds it in engagement with the pin 89 until the pin is opposite the end of the ledge. See Figures 4 and 2. The cam 72 will move rearwardly with the bar 79 to the full line position shown in Figure 1. The levers will not be moved by the rearward movement of the cam as the surface 75 on the cam will engage dog 68 and push it aside. The spring 69 repositions the dog ahead of the head 74 after the cam 72 returns to its rear position.

Control lever 103 now cannot be moved out of slot L as the selectors are prevented from rotation by pin 107 due to projection 114 being moved into its path by the movement of rod 45. With the gearing in low gear and it is desired to place it in intermediate gear, the clutch pedal is again so depressed that the mechanism between it and the selectors will move the selectors to their innermost position carrying with them shifting fork 43 as a result of the engagement of collar 38 with the hub portion of the shifting fork. With the clutch pedal held in this position, which is determined by the amount of resistance on the clutch pedal, control lever 103 is now moved out of the L slot, this movement now being freely permitted by the interlock as the shifting forks are both in their neutral position, detent 55 dropping into the end of the groove marked I, thus connecting shifting fork 46 to finger 35. Continued downward movement of the clutch pedal now causes cam 72 to rotate levers 59 and 60 so as to spread the selectors apart thus causing shifting fork 46 to be carried with selector 31 since detent 55 engages the end of groove I. During this outward movement of the selectors, the shifting fork will first cause the synchronizing member 19 to become operative to cause the teeth of clutch element 17 and the teeth of the slidable clutch element 18 to rotate at synchronous speed. The operating of this synchronizing element would produce some resistance on the clutch pedal if it were not for the booster spring 83 between bar 79 and cam 72. When this resistance is presented, this spring will be compressed sufficiently to allow pin 81 to directly engage projection 78 on the cam element. By compressing spring 83 there is energy stored therein which will be sufficient in conjunction with the force being applied by the clutch pedal to cause clutch element 18 to engage with clutch element 17, thus establishing intermediate gear. By means of the booster spring, the resistance caused by the synchronizing mechanism will be smoothed out over a considerable distance of travel of the clutch pedal instead of becoming effective at one moment. It is thus seen that the shifting operation is performed in a smooth manner notwithstanding the resistance which is set up by the functioning of the synchronizing mechanism.

When it is desired to place the change speed gearing in high, the clutch pedal is first depressed sufficiently to disengage the clutch and move the selectors to their innermost position to neutralize the gearing and then lever 103 is moved from the end of the slot marked I to the end of the slot marked H. The selectors, now being permitted by the interlock to be rotated, will assume a position where the groove marked H on finger 39 of selector 32 will receive detent 55. Continued downward movement of the clutch pedal will now cause the levers to move the selectors outwardly to their normal positions. The outward movement of selector 32 will carry with it shifting fork 46, thus causing the synchronizing element 19 to become operative and clutch element 18 to engage clutch element 16 of the end of driving shaft 5. The resistance offered by the operation of the synchronizing mechanism during this forward movement of the shifting fork is smoothed out by booster spring 83 is a manner already set forth.

When any gear ratio of the change speed gearing is operative and it is desired to select any other gear ratio, it is only necessary to first depress the clutch pedal sufficiently to neutralize the gearing, move the control lever to the properly indicated position to connect the proper shifting fork to one of the selectors, and then depress the clutch pedal farther to spread apart the selectors to render active the selected gear ratio.

The reverse gearing of the transmission is made operative by sufficiently depressing the clutch pedal to first neutralize the gearing and the moving of the control lever to the slot marked R. This will cause the R groove in selector 31 to receive detent 50, whereby the end of the slot will move shifting fork 43 rearwardly and cause gear 14 to mesh with idler gear 15 when the clutch pedal is depressed farther.

When it is desired to neutralize the gearing and permit it to remain in neutral condition without holding the clutch pedal at the proper depressed position, the clutch pedal is first depressed to neutralize the gearing and then control lever 103 is moved to the position shown in full in Figure 10. This will cause the selectors to be rotated to a position wherein groove N is engaged by detent 50. The selectors will now remain in their innermost position if the clutch pedal is released. In the event the clutch pedal is fully depressed and then released, the selectors will be moved to their outermost position but the shifting forks will not be moved since groove N extends over the entire length of the adjacent fingers 34 and 40. With detent 50 in groove N, the selectors are in a position wherein pin 107 of the interlock mechanism is, as shown in Figure 16, thereby locking both rods since, under these conditions, neither U-shaped member 108 nor 109 can move inwardly.

Figures 7, 8, 9, 14, 17:
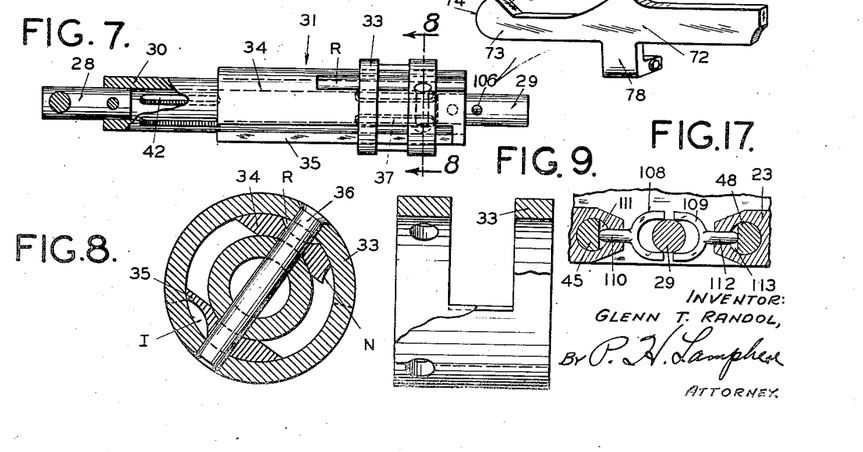
Figure 7 is a view of one of the selectors and the rotatable shaft upon which it is mounted.
Figure 8 is a cross-sectional view taken on the line 8—8 of Figure 7.
Figure 9 is a side view, partly in section, of the collar shown in Figure 8.
Figure 14 is a perspective view of the actuating cam.
Figure 17 is a view similar to Figure 16 showing a modified interlocking mechanism.

If it is desired to have the control mechanism preselective so that the desired future gear may be selected prior to the neutralizing of the transmission, this can be accomplished by a slight modification of the interlocking mechanism. Referring to Figure 17, the modified interlocking mechanism is identical with that previously described with the exception that projections 114 and 115 are not employed on the U-shaped members 108 and 109, and pin 107 carried by shaft 29 is also not employed. The same reference characters have been used to designate the other parts of the interlock as were used in describing the interlock shown in Figure 16. With projections 114 and 115 and pin 107 eliminated, the selectors are free to be rotated to any desired position. If, for example, with this interlock employed in the control mechanism and the gearing is in second or intermediate gear and it is desired to shift to high speed gear, control lever 103 will be first moved out of the I slot and into the H slot. This will cause the selectors to be rotated to a position where detent 55 is in alignment with groove H in finger 39. To neutralize the second speed gear and render the high speed gear operative, it is now only necessary to fully depress the clutch pedal. This operation will cause the main vehicle clutch to first be disengaged, the selectors moved to their innermost position by the action of nose 74 of cam 72, and then the selectors moved away from each other to their outermost position by the action of the inclined surface 76 of cam 72 operating on roller 67. The movement of the selectors to their innermost position causes shifter fork 46 to be moved to its neutral position by collar 33 and when it reaches this point, detent 55 will drop into groove H and engage against the end of the groove. When the selectors move outwardly, shifting fork 46 will be carried with selector 32 by the engagement of detent 55 with the end of the H groove. It is thus seen that with the gearing in gear, the desired future gear may be selected by proper movement of control lever 103 without the necessity of neutralizing the gearing and then the gearing neutralized and the selected gear made operative by one continuous movement of the clutch pedal.

The gearing arrangement shown is such that shifting fork 46 for the second and high speed gears need not be moved as far from its neutral position to cause these gear ratios to be active as shifting fork 43 must be moved from its neutral position to cause the low and reverse speed gears to be active. It is, therefore, advisable to employ some type of stop means for limiting the outward movement of the selectors which will be effective only when the second and high fork 46 is moved. Referring to Figures 1, 3, and 15, the means I employ to accomplish this result comprises a rotatable member 116 pivoted to casing cover 25 against rod 48 and having an offset forked portion 117 overlying the rod. This forked portion cooperates with a pin 118 carried by rod 48 and each time the rod is reciprocated, member 116 will be rotated. The body of the member is provided with a recess 119 (Figures 1 and 3) which is adapted to cooperate with and receive a projection 120 on arm 64 of lever 60 which moves selector 31.

With this construction, when shifting fork 43 is moved by selectors 31 and 32 to render the low or reverse gear active, member 116 will remain in its position, as shown in Figure 1, and levers 59 and 60 will be free to move outwardly their full distance since projection 120 on lever 60 will move into recess 119 in member 116. When shifting fork 46 is moved by selectors 31 and 32 to render the second or high gear active, the movement of rod 48 will cause member 116 to be rotated and thus move recess 119 to a position where projection 120 on lever 60 cannot be received therein. The projection will, therefore, abut against the cylindrical surface of member 116 and permit levers 59 and 60 to move outwardly only a sufficient extent to properly engage either the second or high speed positive clutch. Thus it is seen that there is no danger of throwing any strain on the spring-pressed detent 55 or the shifting fork by a movement of levers 59 and 60 outwardly beyond that necessary to properly shift clutch element 18.

Referring to Figures 18 and 19, I have shown a slightly modified construction in which the cam actuating mechanism for levers 59 and 60 is replaced by a rack and gear actuating mechanism. The cam 72 has substituted therefor a rack 121 having a projecting portion 78' for engagement by pin 81 of bar 79. The teeth of the rack engage the teeth of gear 122 which is provided with a flat surface 123 and a shoulder 124. The levers 59 and 60 are the same as in the previous construction with the exception that lever 59 carries only roller 67, dog 68 being placed upon lever 60. The remainder of the structure is the same as previously described.

When rack 121 is moved by the clutch pedal through bar 79, gear 122 will be rotated and shoulder 124 thereof will engage dog 68. Continued rotation of the gear will cause the levers to be moved simultaneously, thus bringing the selectors to their innermost position, as shown in Figure 18, and neutralizing the transmission. When shoulder 124 passes the dog, the flat surface 123 of the gear will engage roller 67 and rotate the levers in the opposite direction, thus moving the selectors outwardly and rendering active a speed ratio if one has been selected. The return movement of the clutch pedal will move the rack rearwardly without moving the levers since shoulder 124 on gear 122 will push dog 68 aside during its reverse rotation.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a control mechanism for a change speed gearing, the combination of shifting means therefor, two rotatable members for selecting the shifting means for the different speed gears, means for rotating said members, interconnected levers for moving the rotatable members toward or away from each other, cam means, means moving the cam means, and means cooperating with said cam means and so associated with the levers that movement of said cam means in a single direction will move said levers to cause the rotatable members to move toward and away from each other.

2. In a control mechanism for a change speed gearing having a plurality of different gears and shifting means therefor, the combination with a clutch mechanism having a clutch pedal, two rotatable members for selecting the shifting means for the different speed gears, means for rotating said members, interconnected levers for moving the rotatable members toward or away from each other, cam means, and means cooperating with said cam means and so associated with the levers that movement of said cam means in a single direction will move said levers to cause the rotatable members to move toward and away from each other, and a connection between the clutch pedal and the cam means for moving the cam means in the single direction after the clutch pedal has disengaged the clutch mechanism.

3. In a control mechanism for a change speed gearing having a plurality of speed gears and shifting means therefor, companion rotatable members for selecting the shifting means for the different speed gears, interconnected levers for moving the rotatable members axially toward or away from each other, and means operatively associated with the levers and movable in a single direction for moving said levers to cause the rotatable members to move toward and away from each other.

4. In a control mechanism for a change speed gearing having a plurality of speed gears and shifting means therefor, the combination with a clutch mechanism having a clutch pedal, companion rotatable members for selecting the shifting means for the different speed gears, interconnected levers for moving the rotatable members axially toward or away from each other, means operatively associated with the levers and movable in a single direction for moving said levers to cause the rotatable members to move toward and away from each other, and a connection between said last named means and the clutch pedal for moving said means after the clutch pedal has disengaged the clutch mechanism.

5. In a control mechanism for a change speed gearing having a plurality of speed gears and shifting forks therefor, the combination with a clutch mechanism having a clutch pedal, means including two rotatable members for selecting the shifting forks for the different speed gears, means for rotating said members, interconnected levers for moving the rotatable members toward or away from each other, a longitudinally slidable cam, cooperating means between the cam and the levers for moving the levers to cause the rotatable members to move toward and away from each other by a movement of the cam in one direction and permitting said cam to move in the opposite direction without moving the levers, and a connection between the clutch pedal and cam for moving the cam after the clutch pedal has disengaged the clutch mechanism, said connection embodying a lost motion mechanism and a compression spring permitting the clutch pedal to have yieldable movement with respect to the cam.

6. In a control mechanism for a change speed gearing having a plurality of speed gears and shifting forks therefor, the combination with a clutch mechanism having a clutch pedal, means including two rotatable members for selecting the shifting forks for the different speed gears, means for rotating the members, interconnected levers for moving the rotatable members toward or away from each other, a longitudinally slidable rack, a pinion, cooperating means between the pinion and the levers for moving the levers to cause the rotatable members to move toward and away from each other by movement of said rack in one direction and permitting said rack to move in the opposite direction without moving the levers, and a connection between the clutch pedal and the rack for moving said member after the clutch pedal has disengaged the clutch mechanism, said connection embodying a yieldable lost motion mechanism permitting the clutch pedal to have predetermined relative movement with respect to the rack.

7. In a control mechanism for a change speed gearing having a plurality of relatively movable interengageable toothed elements for establishing a plurality of speed ratios and synchronizing means of the friction type associated with the toothed elements to cause them to assume substantially synchronous speed prior to their interengagement, shifting means for the toothed elements of the speed ratios, means for selecting the shifting means, actuating means for moving said selecting means axially in opposite directions to render the speed ratios active or neutral, a member for operating said actuating means, connecting means between the member and actuating means, and means comprising a yieldable member forming a force transmitting part of said connecting means and permitting said member to have predetermined relative movement with respect to said actuating means during the operation of the synchronizing means.

8. In a control mechanism for a change speed gearing having a plurality of relatively movable interengageable toothed elements for establishing a plurality of speed ratios and synchronizing means of the friction type associated with the toothed elements to cause them to assume substantially synchronous speed prior to their interengagement, shifting means for the toothed elements of the speed ratios, means for selecting the shifting means and comprising two rotatable members, actuating means operatively associated with the rotatable members for moving the rotatable members in opposite directions, a clutch pedal, and a yieldable lost motion connection between the clutch pedal and the actuating means through which the clutch pedal transmits force to operate said actuating means and which permits said pedal to have predetermined relative movement with respect to said actuating means during the operation of the synchronizing means.

9. In a control mechanism for a change speed gearing having a plurality of relatively movable interengageable toothed elements for establishing a plurality of speed ratios and synchronizing means of the friction type associated with the toothed elements to cause them to assume substantially synchronous speed prior to their interengagement, shifting means for the toothed elements of the speed ratios, means for selecting the shifting means and comprising two rotatable members, a pair of simultaneously operable levers for moving the rotatable members in opposite directions, means comprising a longitudinally movable member so associated with the levers that movement thereof in one direction will actuate said levers to move the rotatable members in opposite directions, a clutch pedal, and a connection between the pedal and the longitudinally movable member for moving said member after the clutch pedal has disengaged the clutch, said connection embodying a lost motion connection and a spring for permitting said pedal to have predetermined relative movement with respect to said longitudinally movable member in the event the force necessary to operate the synchronizing means is greater than the force necessary to tension the spring.

10. In a control mechanism for a change speed gearing having a plurality of speed gears and shifting means therefor, rotatable means for selecting the shifting means for the different speed gears, actuating means for moving said rotatable selecting means axially in opposite directions to render the speed gear active or neutral, and locking means associated with said shifting means and the rotatable selecting means for preventing the rotation of the selecting means except when the selecting means is in a position wherein the speed gears are neutralized, said means comprising a slidable member rotatable with the rotatable selecting means.

11. In a control mechanism for a change speed gearing having a plurality of speed gears and shifting means therefor, means comprising rotatable members for selecting the shifting means for the different speed gears, a manual control for rotating said rotatable members, actuating means for moving the rotatable members toward each other to cause the gearing to be in neutral or away from each other to cause one of the speed gears to be operative, and locking means associated with the rotatable members and the shifting means for preventing the said members from being rotated except when they have been moved toward each other to their inner position.

12. In a control mechanism for a change speed gearing having a plurality of speed gears and shifting means therefor, means comprising rotatable members for selecting the shifting means for the different speed gears, a manual control for rotating said rotatable members, actuating means for moving the rotatable members toward each other to cause the gearing to be in neutral or away from each other to cause one of the speed gears to be operative, and locking means associated with the rotatable members and the shifting means for preventing the said members from being rotated except when they have been moved toward each other to their inner position, said locking means also embodying means for locking the shifting means in a position corresponding to neutral position of the gearing when the rotatable members are in a predetermined position.

13. In a control mechanism for a change speed gearing having a plurality of speed gears and shifting means therefor, means comprising rotatable members for selecting the shifting means for the different speed gears, manual control means for rotating said members and including a lever and cooperating slots indicating the different speed gears and neutral, actuating means for moving the rotatable members toward each other to cause the gearing to be in neutral or away from each other to cause one of the speed gears to be active, and locking means associated with the rotatable members and the shifting means for preventing the said members from being rotated by the lever except when they have been moved toward each other to their inner position, said locking means also embodying means for locking the shifting means in a position corresponding to neutral position of the gearing when the rotatable members are in a position corresponding to the indicated neutral position of the control lever.

14. In a control mechanism for a change speed gearing provided with shifting forks and longitudinally movable rails for said forks, means for selectively moving each of said rails longitudinally in opposite directions to and from a neutral position, and means for limiting the movement of said moving means when one of said rails is moved thereby, said limiting means comprising a stop member and means operative by the movement of said one rail from its neutral position to thereby cause said stop member to be moved to a position where it will limit the movement of said moving means.

15. In a control mechanism for a change speed gearing provided with shifting forks and longitudinally movable rails for said forks, means for selectively moving each of said rails longitudinally in opposite directions to and from a neutral position, and means for limiting the movement of said moving means when one of said rails is moved thereby, said limiting means comprising a rotatable member having a portion adapted to be placed in the path of movement of a part of the moving means when the rotatable member is in one position and out of the path of movement of said part of the moving means when the rotatable member is in another position and a connection between said rail and the rotatable member for moving said rotatable member to the first named position when said one rail is moved longitudinally from its neutral position and for moving said rotatable member to its other position when said one rail is returned to its neutral position.

16. In a control mechanism for a change speed gearing having a plurality of speed gears and shifting means therefor, rotatable means for selecting the different shifting means, means for moving said shifting means to cause said speed gears to be operative and neutral, and means for rotating said rotatable selecting means to its different positions and comprising a support, a rotatable shaft mounted on the support and connected to the rotatable selecting means, a handle for rotating the shaft, a connection between the handle and the shaft permitting said handle to be moved in its longitudinal direction and transverse to the axis of the shaft and without rotation of the shaft, a plate carried by the support and provided with an H slot, and cooperating means between the handle and the H slot whereby the longitudinal and rotative movements of the handle will be controlled by said H slot.

17. In a control mechanism for a change speed gearing having a plurality of speed gears and shifting means therefor, rotatable means for selecting the different shifting means, means for moving the rotatable means to cause said speed gears to be operative and neutral, and means for rotating said rotatable selecting means to its different positions and comprising a support, a rotatable shaft mounted on the support and connected to the rotatable selecting means, a plate carried by the support and provided with an H slot, a handle having a portion extending through the H slot, a connection between the handle and the shaft permitting said handle to be moved in its longitudinal direction and relative to the shaft to thereby place the portion of the handle which extends through the H slot in either of the parallel slots thereof, and spring means for biasing the handle to a position wherein the portion which extends through the H slot will normally be positioned in one of said parallel slots.

18. In control mechanism for a change speed gearing, the combination of shifting means therefor, two axially movable rotatable members for selecting the shifting means, means for rotating the selecting members, actuating means for moving said rotatable selecting members axially in opposite directions to render different speed gears operative and inoperative, a member for operating said actuating means, connecting means between said member and actuating means and including a lost motion connection and a spring associated therewith, said spring acting as a force transmitting medium as long as the resistance to movement offered by the actuating means is less than the force necessary to cause the spring to so yield that the lost motion will be taken up.

19. In control mechanism for a change speed gearing, the combination of shifting means therefor, rotatable means for selecting the shifting means, means for moving said rotatable selecting means axially in opposite directions to render the different speed gears operative or inoperative, and means comprising a cam associated with the last named means and capable of being moved by a single stroke in one direction for actuating said last named means to cause the rotatable selecting means to move axially in opposite directions

GLENN T. RANDOL.